April 29, 1952

J. L. MATASOVIC 2,595,156

PRESSURE REGULATOR GAUGE GUARD

Filed March 9, 1949

INVENTOR.
John L. Matasovic
BY
L. F. Hammand
Atty.

April 29, 1952

J. L. MATASOVIC 2,595,156

PRESSURE REGULATOR GAUGE GUARD

Filed March 9, 1949

INVENTOR.
John L. Matasovic
BY
L. F. Hammond
Atty

Patented Apr. 29, 1952

2,595,156

UNITED STATES PATENT OFFICE 2,595,156

PRESSURE REGULATOR GAUGE GUARD

John L. Matasovic, Chicago, Ill.

Application March 9, 1949, Serial No. 80,495

3 Claims. (Cl. 73—389)

This specification is a continuation-in-part of my copending application Serial No. 29,183, filed May 25, 1948, entitled "Pressure Regulator Gauge Guard," and the invention here disclosed relates particularly to pressure regulators of the type designed to control the flow of oxygen welding equipment or the like.

In the previous specification it was pointed out that the welding art is old and active, yet so far as known none of the various types and varieties of pressure regulators which have been used from time to time are entirely satisfactory, not only by reason of their inability to function perfectly but also because of their inherently dangerous nature. This is primarily due to the fact that the regulators and the gauges associated with them have been so designed and assembled that the units are of a fragile, delicate nature which may be easily broken by physical impact, as frequently occurs when a large heavy metal cylinder of compressed gas is knocked over. When suddenly released, pressure of the gas in an oxygen cylinder, for example, which is ordinarily about 2,000 pounds per square inch, exhibits a tremendous explosive force that may injure persons working with the equipment unless adequate safeguards are provided. It is true, of course, that various expedients have been suggested in an effort to overcome the inherently dangerous nature of equipment of this kind, but so far as is known, these have failed to gain commercial acceptance, largely by reason of the fact that they have been so cumbersome, so expensive and difficult to use that they are not found acceptable by the trade.

In my prior disclosure these difficulties were overcome and a satisfactory pressure regulating assembly provided by the use of a structure so designed that a high pressure and low pressuge gauge were mechanically nested together within the same housing, yet independent of each other, with the indicating needles of both of the gauges arranged to operate concentrically.

It is the primary object of the present invention to accomplish the desired results in a device so designed that it may employ conventional gauges of standard design, yet at the same time have the inherent features of safety, dependability, and convenience in use as afforded by the structure disclosed in my earlier application.

A preferred construction and arrangement of parts whereby these objects are accomplished is illustrated in the drawings of this specification wherein.

Figure 1:
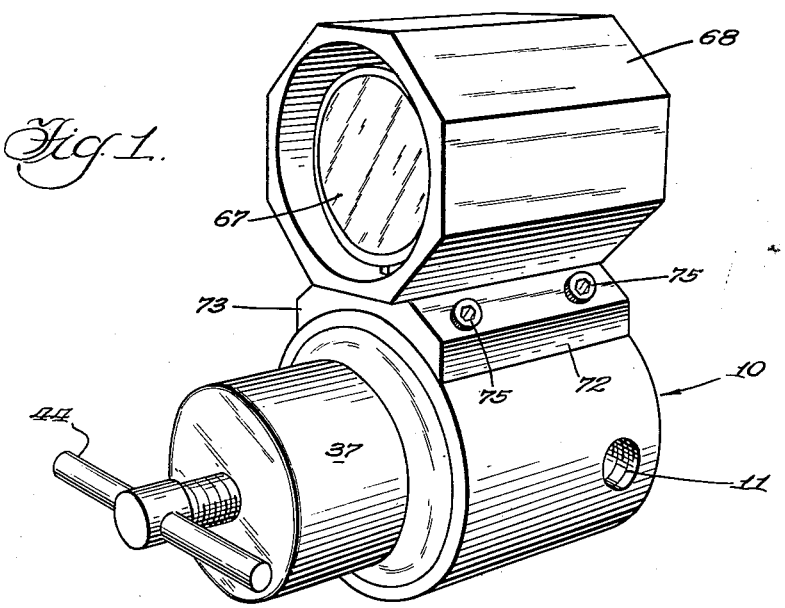
Figure 1 is a front perspective view of a pressure regulator constructed in accordance with these teachings.
Figure 2:
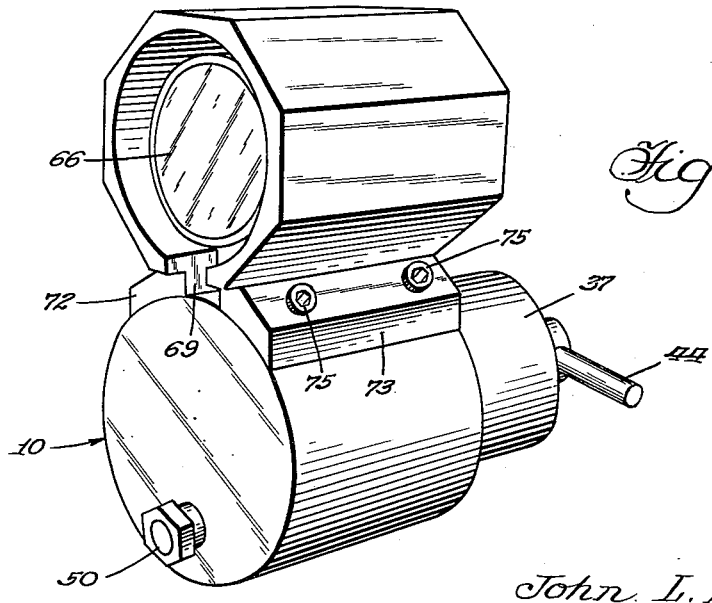
Figure 2 is a rear perspective view.
Figure 3:
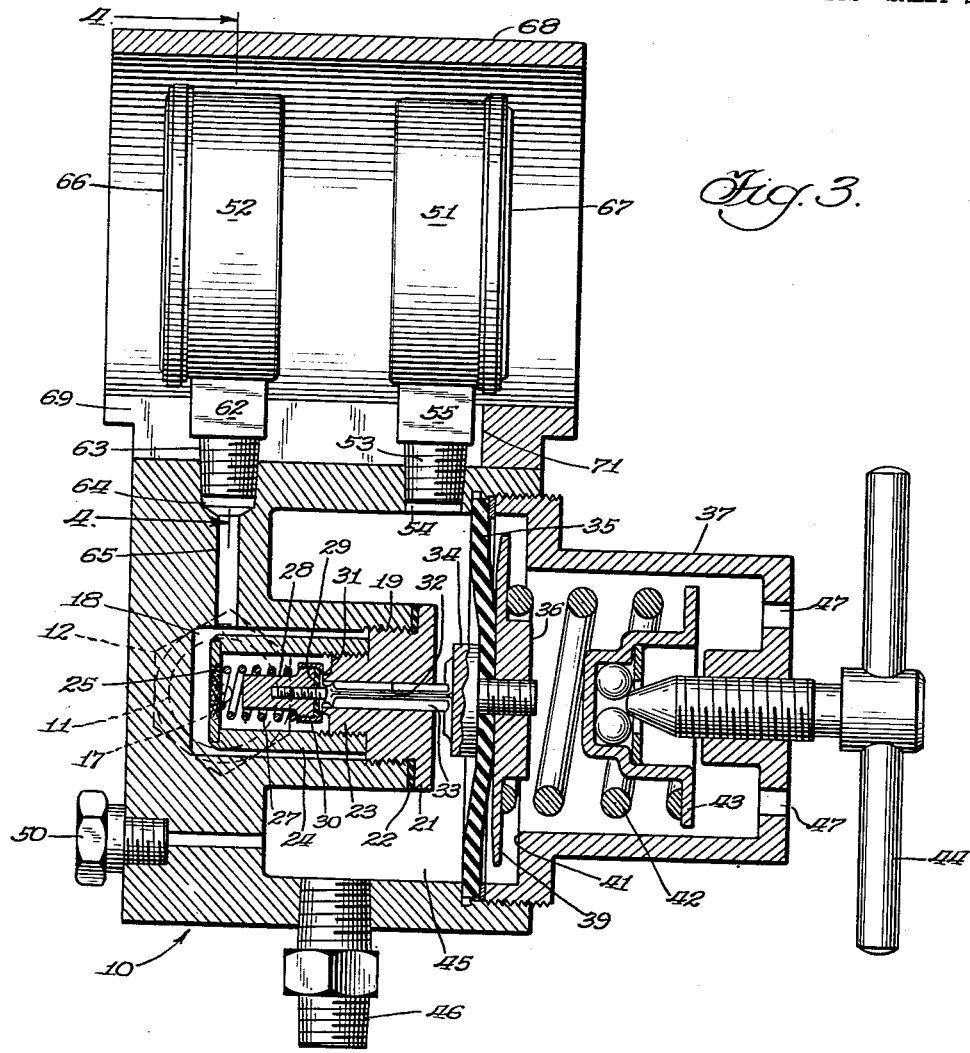
Figure 3 is a central sectional view.
Figure 4:
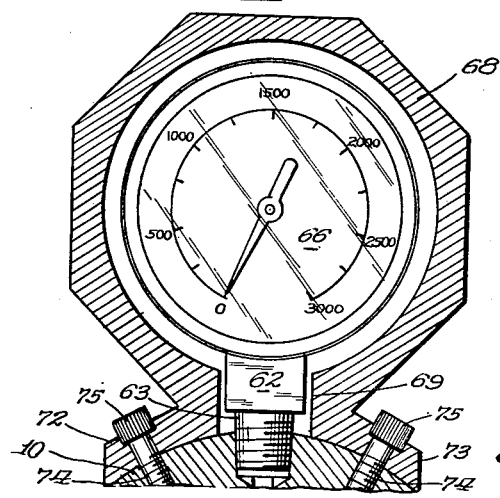
Figure 4 is a fragmental detail sectional view, taken substantially on the plane of the line 4—4 of Figure 3 and showing the manner in which the gauges and guard are associated with the body of the reducing valve.

The regulator includes a generally cylindrical body portion 10 in which a threaded bore 11 is provided for a conventional gas inlet nipple. Such a nipple ordinarily includes a coupling nut 12 whereby the nipple may be secured to a threaded fitting on a compressed gas cylinder so that the entire unit is supported by the nipple. The high pressure gas from the cylinder is supplied through the nipple to the high pressure bore 17 which extends into the central cavity 18 of the regulator. This cavity has internal screw threads 19 at its outer end.

The valve sub-assembly is closed by a threaded nozzle 21 which is provided with a resilient gasket 22 and a screw threaded boss 23. A cylindrical valve housing 24 is threaded on the boss 23, and the entire sub-assembly is arranged to be received in the high pressure chamber when the nozzle 21 is threaded into the threads 19. The valve housing 24 is closed at its inner end by the filter 25 which ordinarily comprises a flat disc of powdered and sintered stainless steel. This disc is conveniently mounted by welding around its marginal edge, so that, as shown, the filter disc supports the upper end of a small coiled compression spring 27, telescoped over the upper end of the seat assembly 28 on the high-pressure valve seat 29. This valve seat is held in place by a flanged cap 30 and is arranged to bear against the annular surface 31 of the nozzle. The seating of the valve is controlled by a splined actuating pin 33 having an end portion threaded into the seat member 28 and extending through the line 32 to a bolt 34 secured to the flexible diaphragm 35 by a nut 36.

The diaphragm 35 is of heavy, but resilient, material clamped on to its seat by a threaded cover 37 formed to include a spring housing. The nut 36 has a rigid backing plate 39 extending outwardly beyond the shoulders 41 in the spring housing to limit the outward movement of the diaphragm. The diaphragm is supported by a coil spring 42, having its outer end carried on a flanged cup 43, the position of which may be manually adjusted by the hand screw 44. The seat 29 controls the flow of gas from the high-pressure chamber 18 through the central opening 32 of the nozzle 21 to the low-pressure chamber 45, from which gas is delivered through the outlet fitting 46. A safety valve 50 is preferably provided. The spring housing 37 is vented at 47 so that the diaphragm functions to balance the pressure in the chamber 45 against atmospheric pressure and the force of the spring 42.

The regulator includes a pair of conventional pressure gauges 51 and 52 for the low-pressure chamber 45 and the high-pressure chamber 18. These are of standard design and construction. The low-pressure gauge 51 has a threaded mounting nipple 53 fitted in a tapped opening 54 in the end of the body 10 of the regulator. A squared shank 55 on the nipple facilitates installation or removal for replacement. This gauge then communicates directly with the low-pressure chamber 45, to give an indication of the working pressure of the gas being delivered through the outlet fitting 46. The high-pressure gauge 52 is also mounted on a nipple 63 having a square shank 62 by which it may be conveniently threaded in the tapped opening 64 in the upper end of the housing 10. This gauge is connected to the high-pressure gas chamber 18 by the port 65.

The high and low pressure gauges are spaced apart just sufficiently so that they may be threaded in place without interference and are oppositely oriented so that their dials 66 and 67 are concentric but face in opposite directions.

A heavy tubular guard 68 has a slot 69 extending from one end to a point 71 near its opposite end so that it may be placed over both the gauges, by placing its flanges 72 and 73 against the outer cylindrical surfaces of the housing 10 and sliding it into position from one end. The upper convex surfaces of the regulator housing 10 have threaded bores 74 to receive machine screws 75 and holds the guard in place. The guard 68 is of heavy, rugged construction, and extends beyond the faces of each of the gauges, so that it protects both gauges and their mounting nipples against accidental impacts. It is entirely open at each end, however, so that although the gauges are completely protected in use, they are also entirely open to view. The gauges are also perfectly accessible for removal, replacement, or servicing, since the guard 68 may be easily removed so that both gauges are fully exposed for inspection or repair.

A regulator according to these teachings affords important advantages over the art, primarily due to the fact that the inherently dangerous construction of conventional regulators is avoided, yet even greater convenience of operation is achieved. The high and low-pressure gauges are closely grouped together and are well protected against accidental damage, yet each is physically and functionally independent of the other. By removing the single guard, either or both of the gauges may be unscrewed and removed from the unit for inspection, repair or replacement. The tubular guard 68 entirely surrounds both of the gauges, and overhangs the dial faces of each sufficiently to preclude any substantial possibility of accidental damage, either to the gauges themselves or to their mounting nipples. It follows that one of the principal causes of physical injury heretofore encountered in prior art devices is eliminated, yet the important step is accomplished by a device utilizing standard types of conventional gauges mounted so that they are fully protected, but nevertheless completely accessible, so that they may be removed or replaced without the necessity of any specially designed tools.

From the foregoing, it will be apparent that the teachings of this invention accomplish several important advances over the prior art, since the present device is not only of such design and construction that the possibility of injury to bystanders by reason of mechanical failure of the component parts of the regulator is materially reduced, but, in addition, a regulator in accordance with the present teachings is more efficient and less likely to be damaged by careless use, and is more susceptible to quick, easy and successful repair in the field.

Having thus described the invention, what I claim as new and desire to protect by United States Letters Patent is:

1. A pressure regulator comprising, in combination, a reducing valve body comprising a generally cylindrical housing, a low pressure gauge and a high pressure gauge having mounting nipples threaded into the cylindrical exterior surface of the housing at points spaced apart from each other; said gauges being in axial alignment and oppositely disposed with respect to each other; together with a relatively long, hollow tubular guard surrounding both of said gauges and removably secured to the outer walls of the reducing valve housing.

2. A pressure regulator comprising, in combination, a reducing valve body comprising a rigid metallic housing, a low pressure gauge and a high pressure gauge having mounting nipples threaded into the housing at points spaced apart from each other; said gauges being in axial alignment and oppositely disposed with respect to each other; together with a relatively long, hollow tubular guard surrounding both of said gauges and removably secured to the outer walls of the reducing valve housing; said guard extending beyond the oppositely disposed faces of the gauges at each end and having its opposite ends open to afford an unobstructed view of both gauges; with a slot in said guard extending from one end thereof beyond the mounting nipples of both gauges to permit removal or replacement.

3. A pressure regulator comprising, in combination, a reducing valve body comprising a generally cylindrical housing, a low pressure gauge and a high pressure gauge having mounting nipples threaded into the cylindrical exterior surface of the housing at points spaced apart from each other; said gauges being in axial alignment and oppositely disposed with respect to each other; together with a relatively long, hollow tubular guard surrounding both of said gauges and removably secured to the outer walls of the reducing valve housing; said guard extending beyond the oppositely disposed faces of the gauges at each end and having its opposite ends open to afford an unobstructed view of both gauges.

JOHN L. MATASOVIC.

REFERENCES CITED

The following references are of record in the file of this patent:

UNITED STATES PATENTS

| Number | Name | Date |
| --- | --- | --- |
| 1,491,192 | Burdett | Apr. 22, 1924 |
| 1,957,972 | Mills | May 8, 1934 |
| 2,103,576 | Dockson | Dec. 28, 1937 |
| 2,237,940 | Koenig | Apr. 8, 1941 |